United States Patent
Libolt et al.

(10) Patent No.: US 11,448,347 B2
(45) Date of Patent: Sep. 20, 2022

(54) TUBULAR JOINT FOR AN INSTALLATION

(71) Applicants: TOTAL SE, Courbevoie (FR); TECHLAM, Cernay (FR)

(72) Inventors: Joël Libolt, Cernay (FR); Ludovic Assier, Courbevoie (FR); Hervé Gueveneux, Courbevoie (FR)

(73) Assignees: TOTAL SE, Courbevoie (FR); TECHLAM, Cernay (FR)

( * ) Notice: Subject to any disclaimer, the term of this patent is extended or adjusted under 35 U.S.C. 154(b) by 14 days.

(21) Appl. No.: 16/973,888

(22) PCT Filed: Jun. 13, 2018

(86) PCT No.: PCT/IB2018/000963
§ 371 (c)(1),
(2) Date: Dec. 10, 2020

(87) PCT Pub. No.: WO2019/239177
PCT Pub. Date: Dec. 19, 2019

(65) Prior Publication Data
US 2021/0364109 A1    Nov. 25, 2021

(51) Int. Cl.
*F16L 27/08* (2006.01)
(52) U.S. Cl.
CPC .................. *F16L 27/0816* (2013.01)
(58) Field of Classification Search
CPC ... F16L 27/0816; F16L 27/053; F16L 27/082; F16L 27/1012; F16L 27/1021; F16L 23/0283
See application file for complete search history.

(56) References Cited

U.S. PATENT DOCUMENTS

| 409,277 | A | * | 8/1889 | Curley | ............... | F16L 27/053 |
| | | | | | | 285/341 |
| 1,197,588 | A | * | 9/1916 | Austin | ............... | F16L 27/053 |
| | | | | | | 285/349 |

(Continued)

FOREIGN PATENT DOCUMENTS

| AT | 250747 | B | * | 11/1966 |
| DE | 1164765 | B | * | 5/1965 |

(Continued)

OTHER PUBLICATIONS

International Search Report issued in corresponding International Patent Application No. PCT/IB2018/000963 dated Dec. 12, 2018.

*Primary Examiner* — Zachary T Dragicevich
*Assistant Examiner* — James A Linford
(74) *Attorney, Agent, or Firm* — Troutman Pepper Hamilton Sanders LLP

(57) ABSTRACT

A tubular joint having an outer part formed by a fitting end of a piping element, and defining a first axis, an inner part formed by a spigot end of another piping element, the spigot end received in the fitting end. The fitting end and the spigot end define a fluid internal circulation space. A flange attached on the outer part and axially abutting against a shoulder formed by the inner part. A layer of polymeric material, extending radially between the outer and inner part, having a radially outer and inner surface both surrounding the first axis and bonded respectively to the outer and inner parts. The inner part rotatable with respect to the outer part about the first axis, and the inner part defining a second axis forming a pitch angle with the first axis. The inner part, the outer part, and the flange limit the pitch angle to lower than 5°.

16 Claims, 2 Drawing Sheets

(56) References Cited

U.S. PATENT DOCUMENTS

| | | | | |
|---|---|---|---|---|
| 1,998,632 | A | * | 4/1935 | Mclaughlin ......... F16L 27/0816 |
| | | | | 285/341 |
| 3,880,120 | A | * | 4/1975 | Shulick ................ F16L 27/082 |
| | | | | 285/281 |
| 4,229,024 | A | | 10/1980 | Oberrecht et al. |
| 2016/0341345 | A1 | | 11/2016 | Williams et al. |

FOREIGN PATENT DOCUMENTS

| | | | | |
|---|---|---|---|---|
| EP | 0990829 A1 | * | 4/2000 | |
| FR | 1399134 A | * | 5/1965 | |
| FR | 549 422 A | | 2/1970 | |
| FR | 2 011 439 A1 | | 3/1992 | |
| WO | WO-9320376 A1 | * | 10/1993 | .......... F01N 13/1811 |

\* cited by examiner

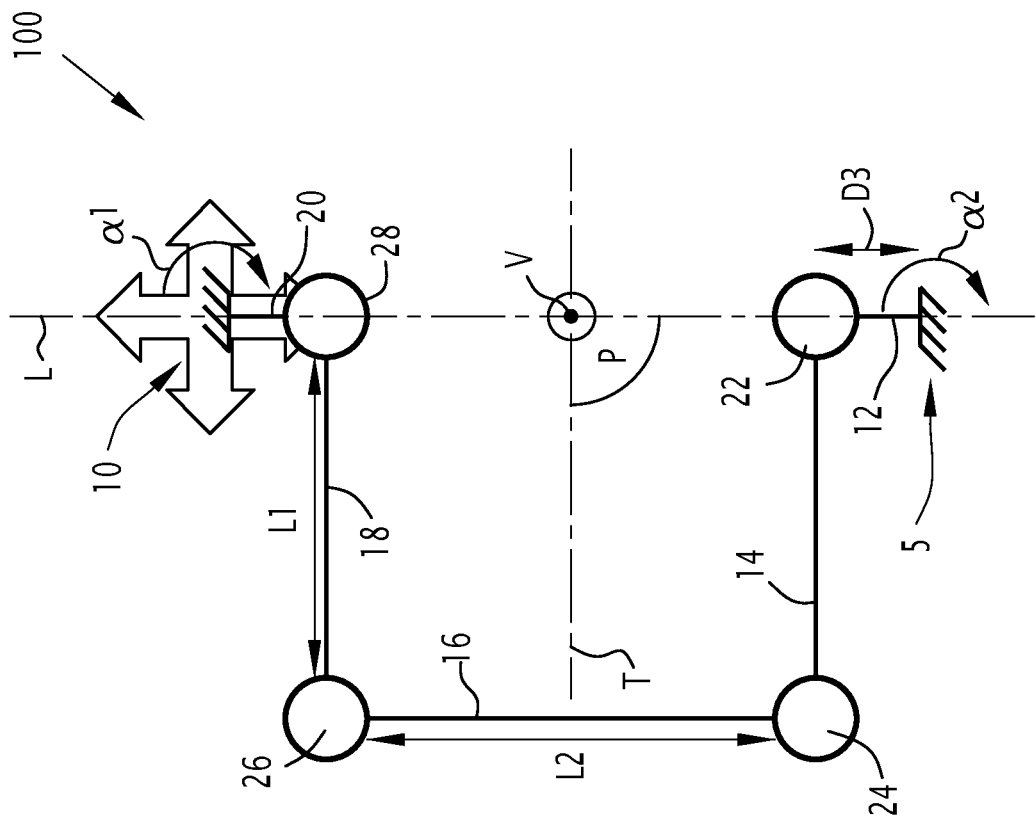
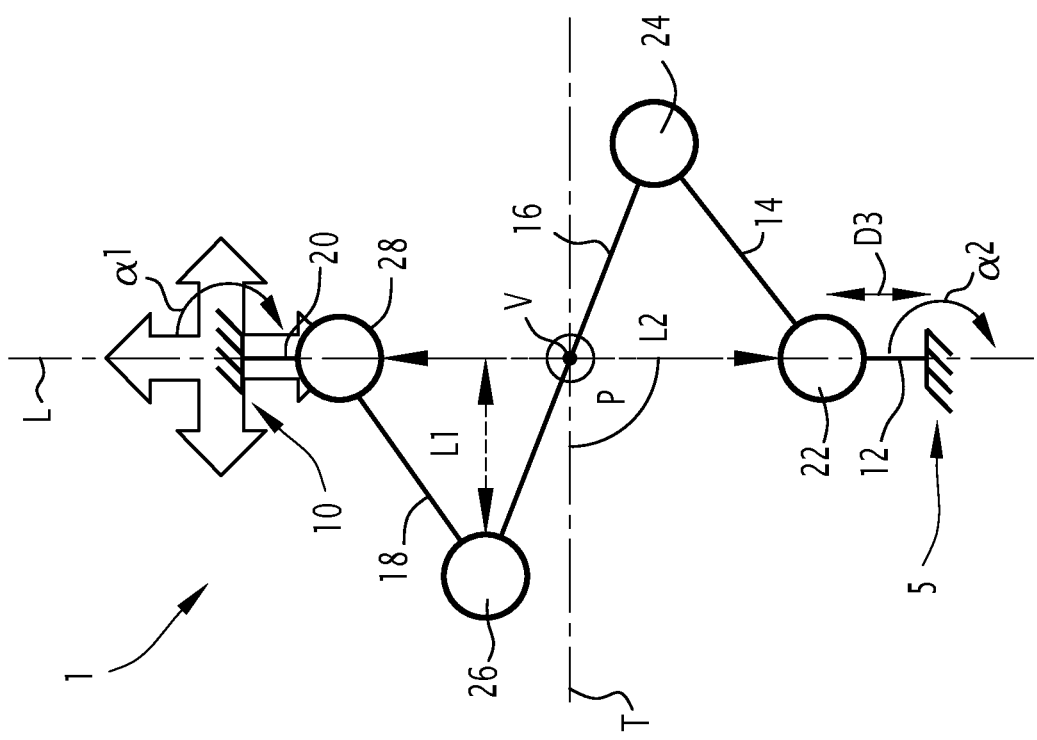

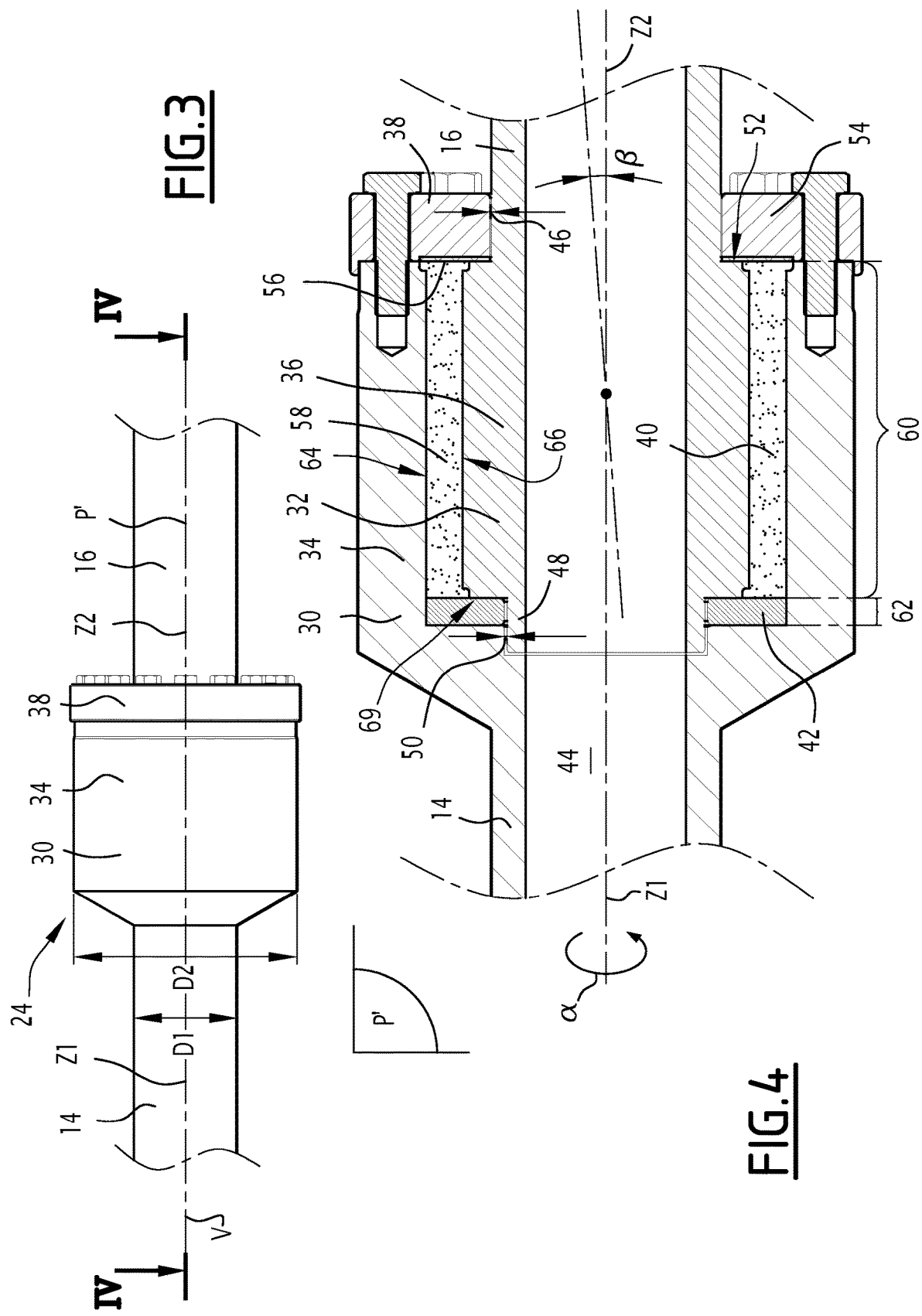

TUBULAR JOINT FOR AN INSTALLATION

CROSS REFERENCE TO RELATED APPLICATION

This is a U.S. National Phase application under 35 U.S.C. § 371 of International Patent Application No. PCT/162018/000963, filed Jun. 13, 2018. The entire contents of which are hereby incorporated by reference.

FIELD OF THE INVENTION

The present invention deals with a joint for an installation, for example an oil and gas one, linking two piping elements.

The present invention also deals with such an installation including said joint.

BACKGROUND

Such a joint is also called an inline flexible element (IFE), because it links two elements in a flexible manner.

Spools and jumpers are known elements used to connect subsea structures. After installing these structures, a subsea metrology is usually required to adjust the relative positions of the connected elements.

Using an inline flexible element in a subsea structure adds flexibility and decreases or removes the need for costly subsea metrology. Besides, this added flexibility also contributes to optimize the design of the subsea installation and allows reducing the overall size of the installation.

An aim of the invention is to provide a flexible element allowing flexibility in an installation, for example a subsea one, while being less expensive to implement and lighter than existing solutions.

SUMMARY

To this end, the invention proposes a tubular joint for an installation, the tubular joint comprising:
- an outer part formed by a fitting end of a piping element, the outer part defining a first axis,
- an inner part formed by a spigot end of another piping element, the spigot end being received in the fitting end, the fitting end and the spigot end defining an internal circulation space for at least a fluid,
- a flange attached on the outer part and axially abutting against a shoulder formed by the inner part in order to prevent the spigot end from exiting the fitting end, and
- a layer of polymeric material extending radially between the outer part and the inner part, the layer having a radially outer surface and a radially inner surface both surrounding the first axis and both bonded respectively to the outer part and to the inner part,
- the inner part being movable in rotation with respect to the outer part about the first axis.

In other embodiments, the tubular joint comprises one or several of the following features, taken in isolation or any technically feasible combination:
- the inner part defines a second axis forming a pitch angle with the first axis, and the inner part, the outer part and the flange being configured in order to limit the pitch angle to values lower than 5°;
- the inner part is movable in rotation with respect to the outer part about the first axis reversibly from a rest position, in which the layer is at rest, to a torn position, in which the inner part defines a torsion angle with respect to the outer part, the torsion angle being at least 5°;
- the elastomeric material comprises rubber, preferably hydrogenated nitrile butadiene rubber;
- the layer axially extends over more than 150 mm;
- the layer axially abuts against the flange;
- the flange and the inner part are configured to allow a circular gap between each other around the second axis when the first axis and the second axis are aligned with each other, and the outer part and a distal extremity of the inner part are configured to allow a circular gap between each other around the first axis when the first axis and the second axis are aligned with each other, said circular gaps being adapted for allowing said pitch angle;
- the radially outer surface and the radially inner surface are cylindrical or frustoconical, and preferably parallel to each other in cross-section along a radial plane;
- the tubular joint further including a ring comprising a polymer material, preferably a fluoroelastomer, the ring being radially located in between the outer part and the inner part and configured to prevent contact between the layer and said fluid;
- the outer part, the inner part and the flange define a housing having a first section axially proximal with respect to the flange, and a second section axially distal, the first section being completely filled with the layer, and the second section being at least partly filled with the ring;
- the flange comprises a main body, and an annular plate located in between the main body and said shoulder, said plate being adapted to reduce friction between the flange and the inner part, said plate preferably comprising PTFE.

The invention also deals with an installation comprising:
- at least one tubular joint as described above, and
- at least a piping element forming said outer part, and at least another piping element forming said inner part.

In other embodiments, the installation comprises one or several of the following features, taken in isolation or any technically feasible combination:
- the installation further comprises an inline tee and/or a Christmas tree;
- the installation comprises at least two tubular joints, the first axis of each of the four tubular joints being approximately parallel to a same reference direction, and at least one piping element connecting said two tubular joints successively so as to form a chain; and
- the chain, seen in the reference direction, is "U" shaped or "Z" shaped.

BRIEF DESCRIPTION OF THE DRAWINGS

The invention and its advantages will be better understood upon reading the following description, given solely by way of example and with reference to the appended drawings, in which:

FIG. 1 is a schematic upper view of an installation according to a first embodiment of the invention, having a "Z" shape, FIG. 2 is a schematic upper view of an installation according to a second embodiment of the invention, having a "U" shape, FIG. 3 is a side view of one of the tubular joints represented in FIGS. 1 and 2, and FIG. 4 is a cross-sectional view of the tubular joint represented in FIG. 3.

DETAILED DESCRIPTION

FIG. 1 shows a subsea installation 1 according to a first embodiment of the invention.

However, the invention is not limited to subsea. As variants, the installation 1, in all its embodiments, may be an offshore one (surface connection to subsea for example), an offshore/offshore one (between platform and ship for example), an offshore to shore one, and an onshore one.

The installation 1 comprises two pieces equipment, for example an in-line tee 5 and a Christmas tree 10 (each symbolized as ground), piping elements 12, 14, 16, 18, 20 connecting the two pieces of equipment, and tubular joints 22, 24, 26, 28 connecting the piping elements.

As variants, the connected pieces of equipment may be Flex joints, manifolds, Flow Line End Termination (FLET), or any subsea module.

The connected pieces of equipment may be ship vehicles which have relative movement to each other (FPSO to tanker for example).

The in-line tee 5 and the Christmas tree 10 are aligned in a longitudinal direction L which is for example approximately horizontal.

The piping elements 12, 14, 16, 18, 20 are for example rigid spools or compact jumpers, the piping elements 12 to 20 are for example made of carbon steel or stainless steel, which make them rigid. They are advantageously adapted to convey typical fluids of the oil and gas industry, for example at an internal pressure of about 600 bars, and a temperature of 60° C. to 110° C.

The piping elements 12, 20 are respectively fixed to, or part of, the in-line tee 5 and the Christmas tree 10.

The piping element 14, 16, 18 form a chain extending parallel to a plane P defined by the longitudinal direction L and a transverse direction T approximately perpendicular to the longitudinal direction.

The transverse direction T is for example approximately horizontal.

A direction V is also defined as perpendicular to both the longitudinal direction L and the transverse direction T. In the example, the direction V is approximately vertical.

Each of the piping elements 14, 16, 18 has a fitting end 30 and a spigot end 32 respectively belonging to the tubular joints 22, 24, 26, 28 and approximately oriented in the direction V. As a consequence, the piping elements 14, 16, 18 include elbows (not represented) at both of their extremities.

In between their ends, the piping elements 14, 16, 18 have an external diameter D1, advantageously comprised between 100 and 610 mm, for example 168 mm.

In the example, the chain formed by the piping element 14, 16, 18 is "Z" shaped when seen in the direction V.

The tubular joints 24 and 26 are located on either side of the longitudinal direction L at a distance L1 from that direction.

The distance L1 is advantageously comprised between 5 and 20 m, and is for example about 10 m.

The tubular joints 22 and 28 are aligned in the longitudinal direction L and separated by a distance L2 in that direction.

The distance L2 is advantageously comprised between 20 and 50 m, and is for example about 30 m.

The tubular joints 22, 24, 26, 28 are advantageously analogous to each other. So only the tubular joint 24 will be described hereafter with reference to FIGS. 3 and 4.

The tubular joint 24 comprises an outer part 34 defining a first axis Z1 approximately parallel to the direction V, an inner part 36 movable in rotation with respect to the outer part about the first axis, a flange 38 bolted on the outer part, and a layer 40 of elastomeric material extending radially between the outer part and the inner part. The tubular joint 24 optionally includes a ring 42 comprising a high chemical resistant material, for example fluoroelastomer.

The outer part 34 is formed by the fitting end 30 of the piping element 14. The outer part 34 is advantageously mainly symmetrical about the first axis Z1.

The outer part 34 had an external diameter D2, which gives the radial size of the tubular joint 24. Advantageously, the external diameter D2 is smaller than four times, preferably three times, the external diameter D1 of the piping elements. The external diameter D2 is advantageously comprised between 200 and 900 mm, and is for example 375 mm.

The inner part 36 is formed by the spigot end 32 of the piping element 16, the spigot end being received in the fitting end 30 of the piping element 14. The fitting end 30 and the spigot end 32 then define an internal circulation space 44 for a fluid (not represented).

The inner part 36 is movable in rotation with respect to the outer part reversibly about the first axis Z1 from a rest position, in which the layer 40 is at rest, to a torn position (not represented), in which the inner part defines a torsion angle α (FIG. 4) with respect to the outer part, the torsion angle being at least 5°, preferably at least 10°.

The inner part 36 defines a second axis Z2 forming a pitch angle β with the first axis Z1. The inner part 36, the outer part 34 and the flange 38 are advantageously configured in order to limit the pitch angle f to values lower than 5°, and preferably lower than 2°. The inner part 36 is advantageously symmetrical about the second axis Z2.

In FIGS. 3 and 4, the first axis Z1 and the second axis Z2 are aligned. The pitch f is symbolized by a slight displacement of the second axis Z2.

Advantageously, the flange 38 and the inner part 36 are configured to allow a circular gap 46 between each other around the first axis Z1, for example of less than 2 mm, preferably of less than 1.5 mm, when the first axis and the second axis Z2 are aligned with each other. For example, the gap 46 is about 1 mm.

Advantageously, the outer part 34 and an axially distal extremity 48 of the inner part 36 are configured to allow a circular gap 50 between each other around the first axis Z1, for example of less than 2 mm, preferably of less than 1.5 mm, when the first axis and the second axis Z2 are aligned with each other. For example, the gap 50 is about 1 mm.

The circular gaps 46, 50 are adapted for allowing the pitch angle R.

The flange 38 is adapted for axially abutting against a shoulder 52 formed by the inner part 36 in order to prevent the spigot end 32 from exiting the fitting end 30. The flange 38 comprises a main body 54 fixed to the outer part 34, and an annular plate 56 axially located in between the main body and the shoulder 52.

The plate 56 is adapted to reduce friction between the flange 38 and the inner part 36. The plate 56 preferably comprises PTFE.

The outer part 34, the inner part 36 and the flange 38 define a housing 58 having a first section 60 axially proximal with respect to the flange, and a second section 62 axially distal.

The proximal section 60 is advantageously completely filled with the layer 40, and the distal section 60 is at least partly filled with the ring 42. The distal section 62 is for example radially thinner than the proximal section 60, due to a shoulder 69 defined by the inner part 36 and in axial abutment against the ring 42.

The layer 40 has a radially outer surface 64 and a radially inner surface 66 both surrounding the first axis Z1 and both bonded respectively to the outer part 34 and to the inner part 36. The layer 40 is adapted to provide tightness to the tubular joint 24.

The layer 40 axially abuts against the plate 56 of the flange 38, and against the ring 42.

The layer 40 advantageously extends over more than 150 mm axially, preferably over at least 200 mm.

The layer 40 is advantageously configured to provide the tubular joint 34 with a torsion stiffness comprised between 1 and 20 kNm/°, for example about 5 kNm/° (kNm per degree of the torsion angle α).

The elastomeric material of the layer 40 is a polymer, for example rubber, such as, but not limited to, hydrogenated nitrile butadiene rubber (HNBR). The layer 40 is directly bonded, or partially bonded, to the inner part 32 and the outer part 36.

The layer 40 is advantageously confined in the first section 62, which allows it to resist the pressure of the internal fluid.

In a particular embodiment, there is no ring 42. In this case, the layer 40 is advantageously confined in the housing 58.

Advantageously, the tubular joint 24 has no other elastomeric element bonded to the outer part 34 and to the inner part 36 than the layer 40.

The radially outer surface 64 and the radially inner surface 66 are for example cylindrical.

As a variant (not show), one or two of the radially outer surface 64 and the radially inner surface 66 is/are partially frustoconical.

The radially outer surface 64 and the radially inner surface 66 are preferably parallel to each other in cross-section along a radial plane P'.

The polymer material of the ring 42 is preferably made of fluoroelastomer.

The ring 42 is radially located in between the outer part 34 and the inner part 36, and configured to prevent contact between the layer 40 and the fluid under pressure. The ring 42 advantageously prevents or limits contact of the layer 40 with aggressive contents of the fluid.

The ring 42 is advantageously protected by the distal extremity 48 of the inner part 36 from abrasion due to particles in the fluid.

In order to mount the tubular joint 24, the ring 42 is put into place in the outer part 34. Then the inner part 36 is introduced into the outer part 34 along the first axis Z1. The layer 40 is then added in between the outer part 34 and the inner part 36 and bonded to both of them. Finally the flange 38 is attached to, for example bolted on, the outer part 34.

The other tubular joints are mounted in the same manner.

In operation, the tubular joints 22, 24, 26, 28 provide flexibility to the installation 1. Calculations have been performed and have shown that:

the Christmas tree 10 may be moved by +/−2.5 m in the longitudinal direction L and the transverse direction T with respect to the in-line tee 5, the Christmas tree 10 may be rotated +/−5° (angle α1 in FIG. 1) about the direction V with respect to the in-line tee 5, and the in-line tee 5 may be rotated +/−2.5° (angle α2 in FIG. 1) about the direction V, without any of the torsion angles α of the tubular joint 22, 24, 24, 26, 28 being above 10°.

Also, a slight displacement, for example 0.5 m, of the Christmas tree 10 with respect to the in-line tee 5 in the direction V is acceptable. It induces a pitch angle β of 0.4°.

The layer 40 provides tightness. The optional ring 42 limits contacts between the layer 40 and the fluid conveyed in the installation 1.

When the pressure of the fluid applies, the ring 42 and the layer 40 are contained in the housing 58 which forms a rigid envelop, so that there is no way for these elements to deform under the pressure.

During set up of the installation 1, friction between the flange 38 and inner part 36 is limited thanks to the annular plate 56. In addition, there is no differential pressure in the piping elements at this time, thus no end cap effect, and the contact pressure in this area is quite low.

Thanks to the above features, the tubular joints 22 to 28 provide enough flexibility in the subsea installation.

With reference to FIG. 2, an installation 100 according to a second embodiment of the invention will now be described. The installation 100 is analogous to the installation 1 shown in FIG. 1 and operates in the same manner. Similar elements bear the same numeral references and will not be described again. Only the differences will be described in detail hereafter.

The chain formed by the piping element 14, 16, 18 is "U" shaped when seen in the direction V.

The tubular joints 24 and 26 are located on one side of the longitudinal direction L, each of them at the distance L1 from that direction.

The piping element 16 is approximately parallel to the longitudinal direction L and longitudinally extends over the distance L2.

With the same displacements and rotations as mentioned for installation 1, the torsion angles α of the tubular joint 22, 24, 24, 26, 28 of the installation 100 remains below 10°.

So both the "U" and "Z" shapes provide enough flexibility. However, the "U" shape (second embodiment) is slightly preferred, as it allows more compact installations along the plane P for a same maximum torsion angle α allowed.

The invention claimed is:

1. A tubular joint for an installation, the tubular joint comprising:
   an outer part formed by a fitting end of a piping element, the outer part defining a first axis,
   an inner part formed by a spigot end of another piping element, the spigot end being received in the fitting end, the fitting end and the spigot end defining an internal circulation space for at least a fluid,
   a flange attached on the outer part and axially abutting against a shoulder formed by the inner part in order to prevent the spigot end from exiting the fitting end, and
   a layer of polymeric material extending radially between the outer part and the inner part, the layer having a radially outer surface and a radially inner surface both surrounding the first axis and both bonded respectively to the outer part and to the inner part, the inner part being movable in rotation with respect to the outer part about the first axis.

2. The tubular joint according to claim 1, wherein the inner part defines a second axis forming a pitch angle with the first axis, and the inner part, the outer part and the flange being configured in order to limit the pitch angle to values lower than 5°.

3. The tubular joint according to claim 2, wherein:
the flange and the inner part are configured to allow a circular gap between each other around the second axis when the first axis and the second axis are aligned with each other, and
the outer part and a distal extremity of the inner part are configured to allow a circular gap between each other around the first axis when the first axis and the second axis are aligned with each other,
said circular gaps being adapted for allowing said pitch angle.

4. The tubular joint according to claim 1, wherein the inner part is movable in rotation with respect to the outer part about the first axis reversibly from a rest position, in which the layer is at rest, to a torn position, in which the inner part defines a torsion angle with respect to the outer part, the torsion angle being at least 5°.

5. The tubular joint according to claim 1, wherein the polymeric material comprises rubber.

6. The tubular joint according to claim 1, wherein the layer axially extends over more than 150 mm.

7. The tubular joint according to claim 1, wherein the layer axially abuts against the flange.

8. The tubular joint according to claim 1, wherein the radially outer surface and the radially inner surface are cylindrical or frustoconical.

9. The tubular joint according to claim 8, wherein the radially outer surface and the radially inner surface are parallel to each other in cross-section along a radial plane.

10. The tubular joint according to claim 1, further including a ring comprising a polymer material, the ring being radially located in between the outer part and the inner part and configured to prevent contact between the layer and said fluid.

11. The tubular joint according to claim 10, wherein the outer part, the inner part and the flange define a housing having a first section axially proximal with respect to the flange, and a second section axially distal, the first section being completely filled with the layer, and the second section being at least partly filled with the ring.

12. The tubular joint according to claim 1, wherein the flange comprises a main body, and an annular plate located in between the main body and said shoulder, said plate being adapted to reduce friction between the flange and the inner part.

13. An installation comprising:
at least one tubular joint according to claim 1, and
at least a piping element forming said outer part, and at least another piping element forming said inner part.

14. The installation according to claim 13, further comprising an inline tee and/or a Christmas tree.

15. The installation according to claim 13 or 14, comprising:
at least two tubular joints according to, the first axis of each of the four tubular joints being approximately parallel to a same reference direction, and
at least one piping element connecting said two tubular joints successively so as to form a chain.

16. The installation according to claim 15, wherein the chain, seen in the reference direction, is "U" shaped or "Z" shaped.

* * * * *